United States Patent [19]
Whiteside

[11] 3,972,057
[45] July 27, 1976

[54] EXPOSURE CONTROL SYSTEM WITH FOLLOW FOCUS CAPABILITY

[75] Inventor: George D. Whiteside, Lexington, Mass.

[73] Assignee: Polaroid Corporation, Cambridge, Mass.

[22] Filed: Mar. 3, 1975

[21] Appl. No.: 554,926

[52] U.S. Cl. .................................. 354/27; 354/29; 354/47; 354/59; 354/139; 354/149; 354/196; 354/230
[51] Int. Cl.² .......................................... G03B 7/16
[58] Field of Search .................. 354/27, 32, 40, 47, 354/59, 126, 133, 139, 149, 196, 230, 232, 29

[56] References Cited
UNITED STATES PATENTS

| | | | |
|---|---|---|---|
| 3,478,660 | 11/1969 | Land | 354/196 |
| 3,832,722 | 8/1974 | Douglas | 354/59 |

*Primary Examiner*—L. T. Hix
*Assistant Examiner*—Russell E. Adams, Jr.
*Attorney, Agent, or Firm*—Edward S. Roman

[57] ABSTRACT

An improved exposure control system featuring a follow-focus mechanism wherein the geometrical relationship of the mechanical components are determined in a select manner to provide uniform adjustment of the exposure aperture through a trim mechanism irrespective of the actual focus setting. The follow focus additionally may be precisely calibrated despite the cumulative effect attributable to the dimensional variations of the individual components albeit such variations remain within prescribed tolerances.

33 Claims, 9 Drawing Figures

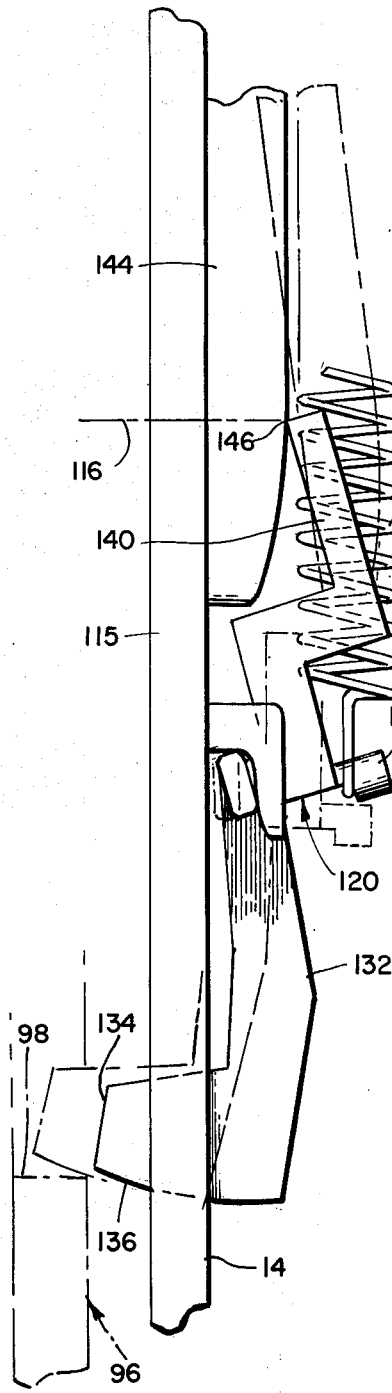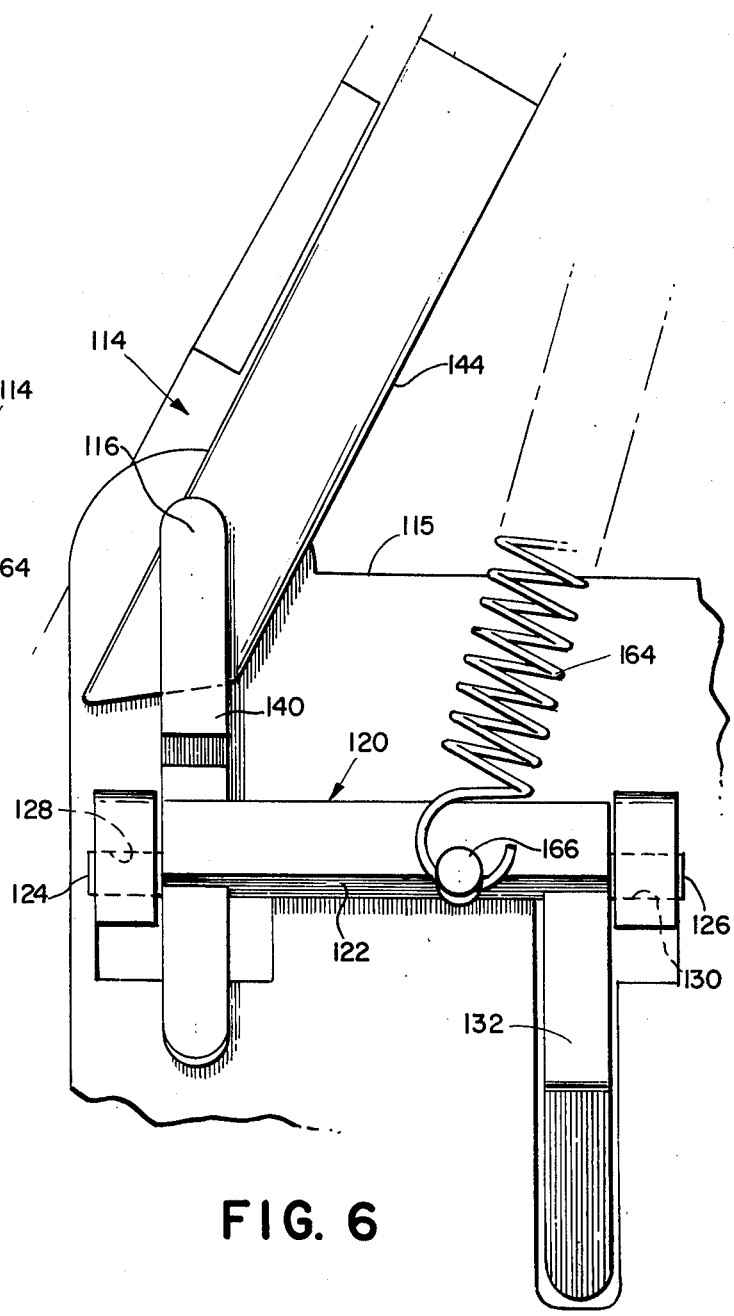
FIG. 5
FIG. 6

EXPOSURE CONTROL SYSTEM WITH FOLLOW FOCUS CAPABILITY

BACKGROUND OF THE INVENTION

1. Field of the Invention

This invention relates generally to an exposure control system for a photographic apparatus and more particularly to an exposure control system having a follow focus capability for a photographic apparatus of the type having means for initiating the energization of a source of artificial light to illuminate a photographic screen.

2. Description of the Prior Art

The exposure system of a photographic camera when operated in conjunction with a flash or transient illumination is ordinarily adjusted as a function of the levels of illumination anticipated at the scene being photographed. An evaluation based on the anticipated level of illumination may be made based upon an application of the inverse square law of light energy propagation which may additionally be weighted to anticipate spurious room reflections: under this law, the light energy available from a given source is considered to vary inversely with the square of the distance from that source. Accordingly, to make an appropriate exposure mechanism adjustment for flash photography, source to subject distance is derived and the value of this distance is utilized to compute an appropriate exposure value or illuminational factor.

In some camera designs, exposure control adjustment for flash operation is effected automatically by incorporating within the apparatus what is termed as a follow focus system. With a follow focus arrangement, aperture adjustment or flash illumination output control is mechanically coupled with the range finding or focusing system of a camera. In effect, a follow focus control represents a second exposure control system for a camera. As such, its presence necessarily contributes to the size and complexity of the camera.

A follow focus control system for an exposure control system is described in a U.S Patent entitled "Focus Responsive Exposure Control System" by V. K. Eloranta and E. K. Shenk, Ser. No. 3,750,543, filed Apr. 19, 1971, and assigned in common herewith. The patent describes a second flash mode control system wherein an electromagnetic device, such as a solenoid, is selectively maneuvered and energized to extend its plunger to arrest position of exposure aperture blades in accordance with focal setting. A complete follow focus system is described in a U.S. Patent entitled "Apparatus and System for Flash Photography" by Lawerence M. Douglas, filed Mar. 15, 1973, Ser. No. 3,832,722 and assigned in common herewith. This system achieves a requisite compactness to meet the overall camera design described in U.S. Pat. No. 3,714,879 and incorporates means for selective use of the follow focus system exclusively during the flash illuminated exposure mode of operation. The above follow focus system additionally provides a trim function to accomodate for slight variations in the sensitometric characteristic of the film as well as to insert a modicum of personal or overriding control over the automated system. The trim control has only one control element for operation in this manner substantially reducing the possibility that a camera operator may become confused or overlook a requirement for providing a trim control for that mode of operation for which he is currently using.

It is therefore a primary object of this invention to provide an improved exposure control system with follow focus capability for a photographic apparatus of the type having means for initiating the energization of a source of artificial light to illuminate a photographic scene.

It is also an object of this invention to provide an improved exposure control system with follow focus capability for a photographic apparatus wherein a selected aperture may be uniformly trimmed by a predetermined number of F/stops regardless of the actual focus setting of the photographic apparatus.

It is a further object of this invention to provide an improved exposure control system with follow focus capability wherein the mechanism may be precisely calibrated despite the cumulative effect attributable to the dimensional variations of the individual components albeit such variations remain within prescribed tolerances.

It is an additional object of this invention to provide an improved exposure control system having follow focus capability wherein the geometrical orientations of the mechanical components are determined in a select manner to provide uniform adjustment of the exposure aperture through a trim mechanism irrespective of the actual focus setting.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

An exposure control system and mechanism is described for a photographic camera apparatus of the type having means for initiating the energization of a source of artificial light to illuminate a photographic scene. The control system includes means for defining an optical path together with an optical objective adjustable to image the photographic scene at an image plane. There are also included focusing means movable to adjust the optical objective, together with exposure means having at least one element movable along a locus of travel for defining a range of apertures over the optical path in correspondence with the exposure element movement. Interceptor means are provided for selective rotation about a first pivot point in spaced relation with respect to the exposure element locus of travel and including an interceptor edge for arresting movement of the exposure element along the locus of travel to define a select aperture value over the optical path. Link means driveably connect to rotate the interceptor means about the first pivot point in order to position the interceptor edge at locations along the locus of exposure element travel defining the select exposure aperture. Cam means are provided for movement in correspondence with the focusing means movement and driveably contact the link means in order to rotate the interceptor means about the first point of pivot thus locating the interceptor edge at a select position establishing an aperture value corresponding with the level of the artificial illumination anticipated at the photographic scene.

The exposure means may additionlly include a walking beam rotatable about a second pivot point and operatively connecting to at least one element for movement in correspondence therewith to define a range of apertures over the optical path.

The camera apparatus may additionally be of the type which is operative in an ambient mode responsive to the light level of a scene being photographed and in a flash mode responsive to the level of artificial illumination anticipated at the scene in which case there must also be provided a drive means to selectively actuate the interceptor means to move into the exposure means element locus of travel during the flash mode of operation.

One distinguishing feature of the herein described invention relates to the cam means surface which is arranged substantially concentric to the optical path.

Another feature of the herein described invention relates to an adjusting means which may be provided to precisely locate the first pivot point about which the interceptor means rotates in order to adjust for the cumulative effect of dimensional variations in the individual components of the exposure control system when mass produced for a commercial camera.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings or when like members have been employed in the different figures to note the same parts and wherein:

FIG. 5 is a enlarged side view showing a broken away portion of the exposure control system of FIG. 1;

FIG. 6 is an enlarged front view showing a broken away portion of the exposure control system of FIG. 1;

DESCRIPTION OF THE PREFERRED EMBODIMENT

Figure 1:
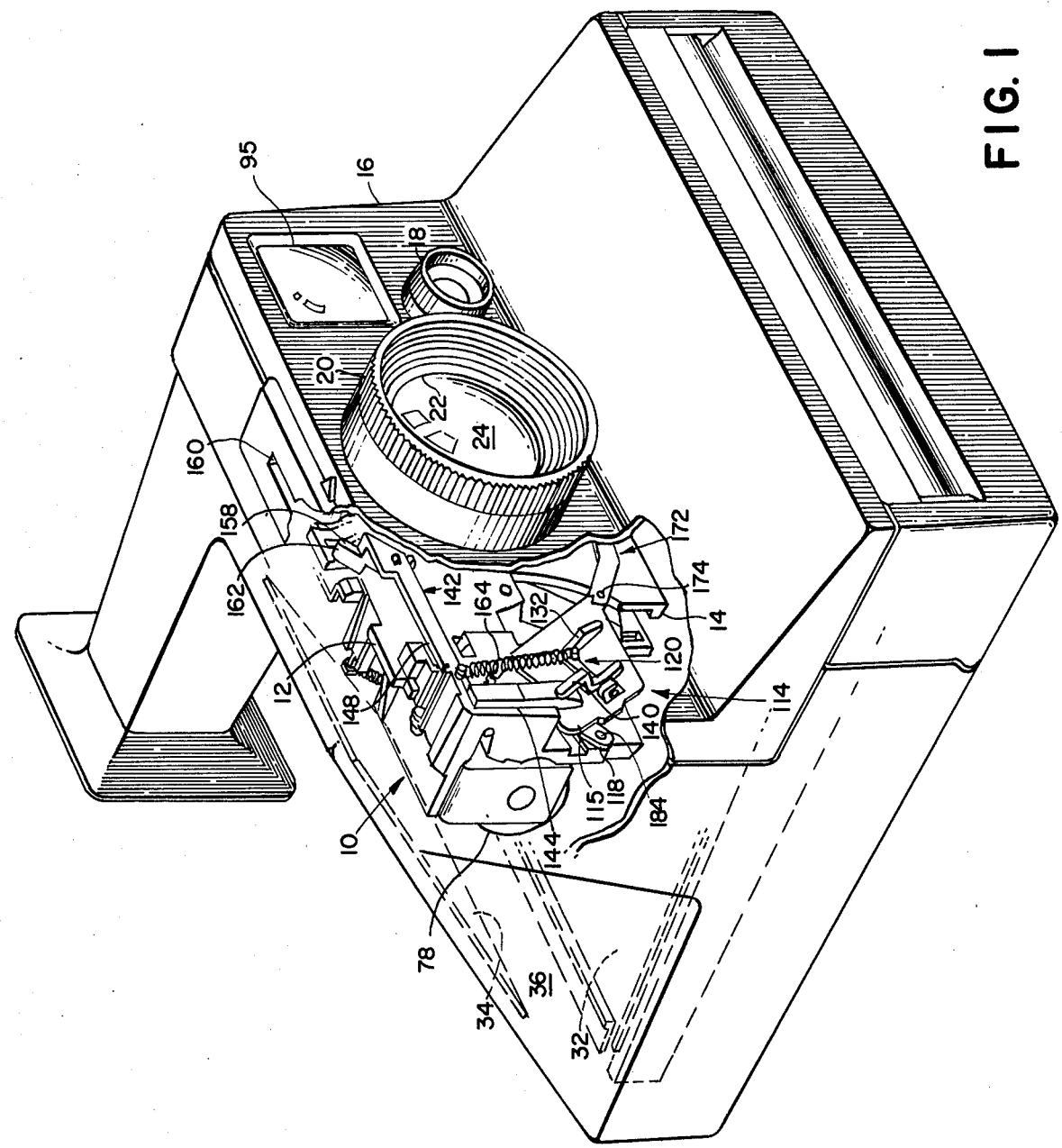
FIG. 1 is a perspective view of a photographic camera embodying the exposure control system of this invention.

Referring now to FIG. 1, it can be seen that the exposure control system of this invention is disposed within an exposure housing 10 comprising a baseblock casting 12 selectively machined to support the components of the exposure mechanism. Surrounding the front and top of the casting 12 there may be provided a cover 16 which includes openings through which protrude manually adjustable trim and focus bezels shown at 18 and 20 respectively. Intermediate the baseblock casting 12 and the front cover 16 there is provided a lens housing casting 14, the central portion of which includes a light entering exposure opening 22 which defines the maximum available exposure aperture for the system.

An objective or taking lens 24 is provided in overlying relation to the light entering opening 22 wherein the objective lens 24 may comprise a plurality of elements retained in predetermined spaced relation by a cylindrical lens mount assembly 28 which is externally threaded for toothed engagement with the internally threaded focus bezel 20. Bezel 20 is made rotatable with respect to the lens housing casting 14 and front cover 16 to provide translational movement of the elements of lens 24 along a central optical axis 30 of the optical path of the housing 10. As is readily apparent, the center optical axis 30 of the optical path is illustrated as being normal to the plane of the drawings in FIGS. 2–4. The rotation of focus bezel 20 may be carried out by manual rotation to provide displacement of the elements of objective lens 24 for focusing of image carrying rays through the light entering exposure opening 22 to a rearwardly positioned film plane 32 by way of a reflecting mirror 34 when the system is embodied in a suitable film exposure chamber 36. Immediately behind the objective lens 24 and light entering exposure opening 22 there are supported two overlapping shutter blade elements 38 and 40 which will be subsequently described in greater detail herein. Extending from the top of the housing 10 is a shutter release button (not shown), the depression of which causes the commencement of an exposure cycle.

A pair of scene light admitting primary apertures 42 and 44 are provided respectively in the blade elements 38 and 40 to collectively define a progressive variation of effective aperture openings in accordance with longitudinal and lateral displacement of one blade element with respect to the other blade element in a manner fully described in a United States Patent Application intitled "Camera with Pivoting Blades" by George D. Whiteside, filed July 2, 1974, and assigned in common herewith. The apertures 42 and 44 are selectively shaped so as to overlap the light entering exposure opening 22 thereby defining a gradually varying effective aperture size as a function of the position of blades 38 and 40. Each of the blades, 38 and 40, may additionally be configured to have corresponding photocell sweep secondary apertures shown respectively at 46 and 48. Secondary apertures 46 and 48 may be configured in correspondence with the shapes of scene light admitting primary apertures 42 and 44. As is readily apparent, the secondary apertures 46 and 48 also move in correspondence with the primary apertures 42 and 44 to define a small secondary effective aperture for admitting the passage of light from the scene being photographed to a light detecting station shown generally at 49. The light detecting station 49 includes a light sensitive circuit having both a photocell and control circuit (not specifically shown) which collectively operate to terminate an exposure interval as a function of the amount of light received through the secondary effective aperture as defined by the overlapping photocell sweep apertures 46 and 48. An exposure control mechanism embodying a light detecting station of the above described type is described in more detail and claimed in a U.S. Patent entitled "Exposure Control System" by V. K. Eloranta, No. 3,641,889.

Projecting from the baseblock casting 12 at a location spaced laterally apart from the light entering exposure opening 22 is a pivot pin or stud 50 which pivotally and translatively engages elongate slots 52 and 54 formed in respective shutter blades elements 38 and 40. Pin 50 may be integrally formed with the baseblock casting 12 and blade elements 38 and 40 may be retained in engaging relation with respect to the pin 50 by any suitable means such as peening over the outside end of pin 50.

The opposite ends of the blade elements 38 and 40 respectively include extended portions which pivotally connect to a walking beam 56. The walking beam 56 in turn is disposed for rotation about a laterally extending stud 60 which journals a centrally disposed elongated integral shaft 58 extending from the back side of the walking beam 56. The stud 60 protrudes laterally from an integral extension 62 of the baseblock casting 12. A centrally disposed integral pin 64 extends from the opposing forward side of the walking beam 56 and is in turn journalled into rotation by a bushing 66 in the lens housing casting 14.

In the preferred mode, the walking beam 56 is pivotally connected at its distal ends to the shutter blade elements 38 and 40 by respective pin members 67 and 68 which extend from the walking beam 56. Pin members 67 and 68 are preferably circular in cross section and extend through respective circular openings 70 and 72 in respective blade elements 38 and 40 so as to slidably engage respective arcuate slots or tracks 74 and 76 which may be integrally formed within the baseblock casting 12. The arcuate tracks 74 and 76 operate to prohibit disengagement of the blade elements 38 and 40 from their respective pin members 67 and 68 during exposure control system operation.

A tractive electromagnet device in the form of a solenoid 78 is employed to displace the shutter blades 38 and 40 with respect to each other and the casting 12. The solenoid 78 may be of conventional design carrying an internally disposed cylindrical plunger unit 80 which retracts inwardly into the body of the solenoid upon energization thereof. The solenoid plunger unit 80 is affixed to the walking beam 56 by means of a guideway 82 at the outward end of the plunger 80 which guideway slidably engages a pivot pin 84 extending laterally from an integral radial crank arm portion 86 of the elongated shaft 58. In this manner longitudinal displacement of the plunger unit 80 will operate to rotate the walking beam about the lateral stud 60 and bushing 66 so as to appropriately displace the shutter blade elements 38 and 40. The blade elements 38 and 40 are continuously urged into positions defining the largest effective aperture over the light entry exposure opening 22 by a biasing tension spring 88. The movable end of spring 88 engages a slot 90 in a second integral radial arm portion 92 extending outwardly from the elongated shaft 58 while the stationary end of spring 88 is grounded by connection to a pin 93 extending from the baseblock casting 12. With the spring connection herein described, the exposure control mechanism of this invention is biased into a normally opened orientation and the shutter blade elements 38 and 40 are drawn to their closed position only while solenoid 78 is energized. Consequently, energization of the solenoid 78 prevents the shutter blades 38 and 40 from moving toward their maximum aperture opening under the urging of spring 80. However, as should be readily understood, the exposure control mechanism of this invention would be equally applicable to photographic systems where the blades 38 and 40 are spring biased in a normally closed position.

The exposure control system is herein described in relation to a photographic camera of the non-single lens reflex type although the intended scope of the invention is by no means so limited and cameras of the well known reflex type as described in U.S. Pat. No. 3,672,281 entitled "Reflex Camera" by E. H. Land may be equally suitable for embodying the exposure control system of this invention.

The following photographic cycle of operation is described in regard to a camera of the non-single lens reflex type wherein the viewfinder 95 does not have a through the lens viewing and focusing capability. The ambient photographic cycle is commenced with the depression of a start button (not shown) whereupon tension spring 88 operates to rotate walking beam 56 in a clockwise direction as viewed from the front of the exposure housing 16 thus moving shutter blade elements 38 and 40 in directions which operate to progressively enlarge the effective aperture over the light entering exposure opening 22. As is readily apparent, rotation of walking beam 56 effects simultaneous translation and rotation of shutter blade elements 38 and 40 about pivot pin 50. Simultaneously photocell sweep secondary apertures 46 and 48 define a corresponding progressively enlarging aperture opening over the photocell. When an appropriate amount of light is received to trigger the light sensitive control circuit, solenoid 78 is again energized to rapidly close blade elements 38 and 40 thereby terminating an exposure interval. The latter energization of solenoid 78 must continue until such a time as a latch 94 is moved into lateral engagement with an integral cam portion 96 of the walking beam 56 in a manner as is more fully described in an application for U.S. Patent, Ser. No. (Our Case No. 5198) by Andrew S. Ivester and David Van Allen, filed concurrently herewith in common assignment. In the preferred mode, the integral cam portion 96 defines an elongated planar cam surface the edge portion of which is shown at 98.

With the ambient operation thus described, relative aperture as well as exposure interval are selectively weighted for any given level of scene brightness so as to optimize the selection of exposure interval and aperture. To trim this ambient performance of the exposure system, an optical trim wedge 100 having selectively variable transmissive properties therethrough, may be pivotally manipulated before the photocell. Adjustment of the position of trim wedge 100 is carried out by manually rotating the trim bezel 18 with respect to a trim mounting plate 102 which is fastened to the lens housing casting 14. The optical trim wedge 100 is disposed for rotation with respect to the trim mounting plate 102 by an interconnecting pivot pin 103. The optical wedge 100 additionally includes an arcuate toothed portion 110 which is drivingly engaged by a peripheral toothed portion 108 around the outside edge of the trim bezel 18, such that manual rotation of the trim bezel in turn operates to rotate the trim wedge 100 about pivot pin 103. Accordingly, manipulation of trim bezel 18 will selectively move the optical trim wedge 100 across the photocell to adjust the amount of light permitted to enter the light sensing control circuit through the photocell sweep secondary apertures 46 and 48. The variable light transmissive properties of the optical trim wedge are provided by a plurality of sections 112, each of which exhibits a different light transmissive property therethrough.

A so called "follow focus" interceptor is provided for operation in conjunction with the focusing components of the camera during the flash mode of operation. The backward side of the lens mount assembly 28 drivingly connects to a radial face cam 168 in a manner such that the radial face cam moves in correspondence with manual adjustment of the focus bezel 20. As previously discussed, focus bezel 20 is rotatable to provide objective lens focusing and thus the rotational orientation of focusing bezel 20 continuously corresponds with the focus setting of the lens system.

The integral cam portion 96 of walking beam 56 moves through a predetermined arcuate locus of travel as shutter blade elements 38 and 40 are driven either under the biasing spring 88 or from the plunger unit 80 of solenoid 78. For follow focus operation, the movement of walking beam 56 along its locus of travel establishing increasingly widening apertures is selectively arrested to establish a predetermined focus responsive apertural value. Motion arrest is provided by way of an interceptor crank assembly 114 which includes inter-alia, an interceptor pin 134 selectively positionable within the above noted locus of travel so as to contact the cam surface 98 of the integral cam portion 96 to halt the exposure mechanism as it moves under the bias of tension spring 88. Relative positioning of the interceptor crank assembly 114 within the locus of travel of integral cam portion 96 is provided by virtue of a pivotal connection between a crank arm plate 115 and an adjusting bar 118 at pivot point 116.

The interceptor pin 134 is operatively associated with the crank arm plate 115 through an interceptor flapper linkage 120 which includes an elongated center portion 122 disposed for rotation relative to the crank arm plate 115 by a pair of integral pins 124 and 126 extending from the opposed ends of the elongated center portion 122. Pins 124 and 126 are respectively disposed for rotation with respect to the crank arm plate 115 by a pair of spaced apart bearing surfaces shown generally at 128 and 130 which extend from the crank arm plate 115. The interceptor flappage linkage 120 additionally includes an integral arm portion 132 extending downwardly from the elongated center portion 122 into fixed connection with the interceptor pin 134. As may be more readily seen by referring to FIG. 5, the interceptor pin 134 includes an arcuate edge surface 136 generated about a center axis coincident with a center axis or rotation pins 124 and 126 thus making the positioning of interceptor pin 134 within the locus of travel of walking beam 56 insensitive to the exact number of degrees thru which the flapper linkage 120 is rotated as will be subsequently described in greater detail. The interceptor flapper linkage 120 also includes an integral arm portion 140 extending upwardly from the elongated center portion 122 into engaging contact at point 146 with an integral arm portion 144 extending downwardly from a longitudinal drive link 148 of an actuating assembly shown generally at 142.

The longitudinal drive link 148 is also disposed for rotation relative to the baseblock casting 12 by a pair of spaced apart integral pins 150, 152 extending from the longitudinal drive link in respective journalled relationship with a pair of appropriate bearing surfaces extending from the baseblock 12. The actuating assembly 142 additionally inclludes an integral arm portion 158 extending upwardly from the elongated drive link 148 and defining a tip portion 162 extending into the area of a linear flash array receiving socket 160.

The interceptor crank assembly 114 is biased for rotation in a counterclockwise direction about the pivot point 116 by a tension spring 164, the moving end of which connects to an integral hook portion 166 which extends outwardly from the elongated center portion 122 of the interceptor flapper linkage 120. The non-moving end of the tension spring 164 is grounded with respect to the baseblock casting 12.

Tension spring 164 also sumultaneously operates to bias flapper linkage 120 to rotate interceptor pin 134 out of the locus of travel of walking beam 56 while at the same time biasing the flapper arm portion 140 into continuous engagement with the actuating assembly 142 so as to maintain the tip portion 162 thereof within the socket 160. The lens mount assembly 28 drivingly connects to a radial face cam 168 defining cam surface 169 concentric with the objective lens 24 optical axis for movement in correspondence with the focus bezel 20. There is additionally included a peripheral flange 171 extending radially outward of the cam surface 169 to provide a light and dust seal.

The radial face cam 168 drivingly engages a rigid adder link 172 at an integral cam follower portion 176 thereof intermediate the ends of the adder link 172. One distal end of the adder link 172 pivotally connects to the interceptor crank assembly 114 at a pivot point 174. The opposite end of the adder link 172 defines a cam portion 178 disposed for simultaneous translation and rotation about a driver pin 180 which is operatively connected to the trim bezel 18 for movement in correspondence therewith in the following manner. As is now readily apparent, tension spring 164 also serves to bias crank arm plate 115 for counter-clockwise rotation about pivot point 116 in this manner facilitating continuous engagement between the follower portion 176 of adder link 172 and the cam 168.

Manual adjustment of trim bezel 18 operates through the meshed teeth 108, 110 to rotate the optical trim wedge 100 about its point of pivotal connection at 103 to the trim mounting plate 102 simultaneously rotating drive pin 180 which is in fixed connection thereto. Thus manual adjustment of the trim bezel 20 operates to simultaneously vary light transmission to the photocell while at the same time rotating drive pin 180 about the trim wedge pivot point at 103. The cam portion 108 may be maintained in continuous driving engagement with pin 180 through overlying link portions 182 which integrally connect to a second pin 183 extending from the optical trim wedge 100.

Figure 2:
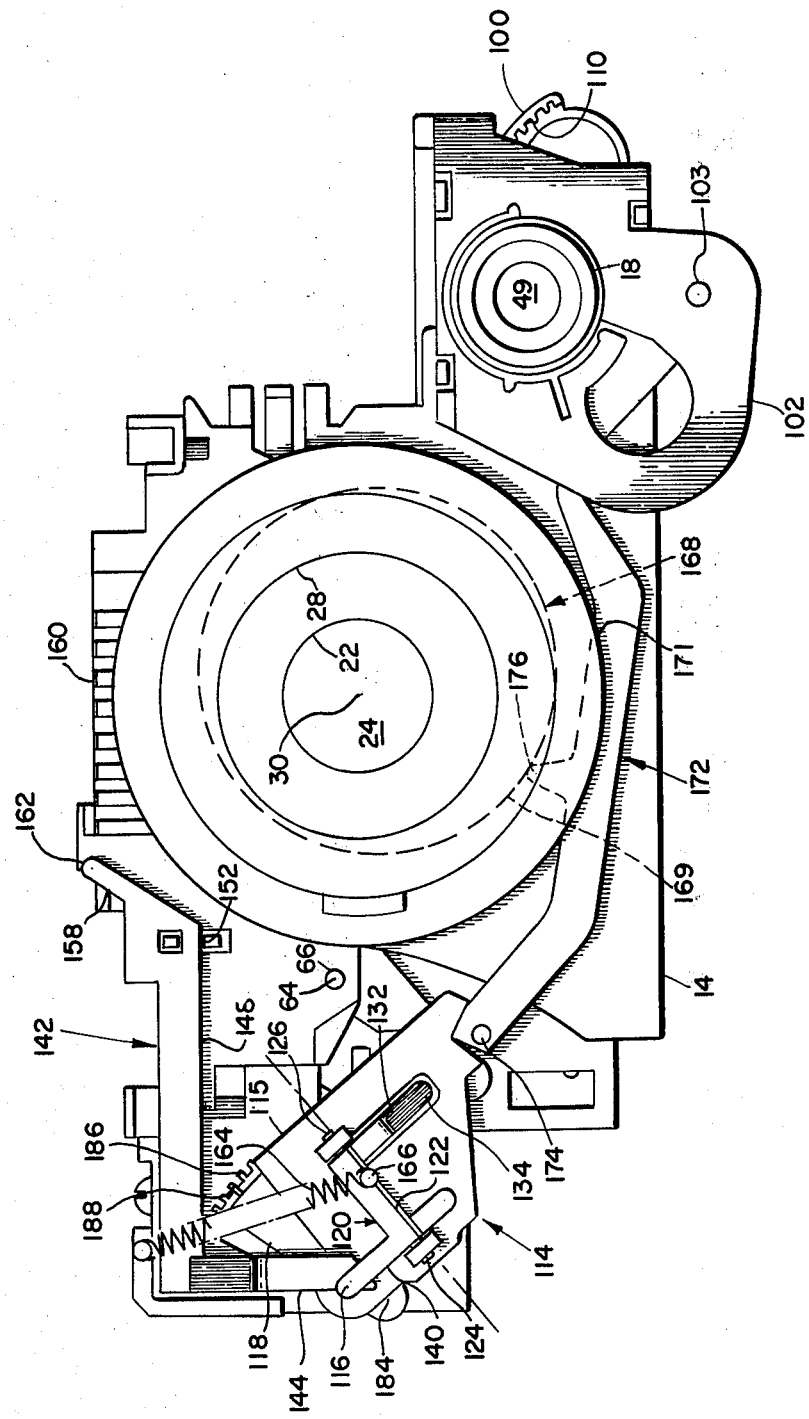
FIG. 2 is a cutaway front view of the exposure control system of FIG. 1.
Figure 3:
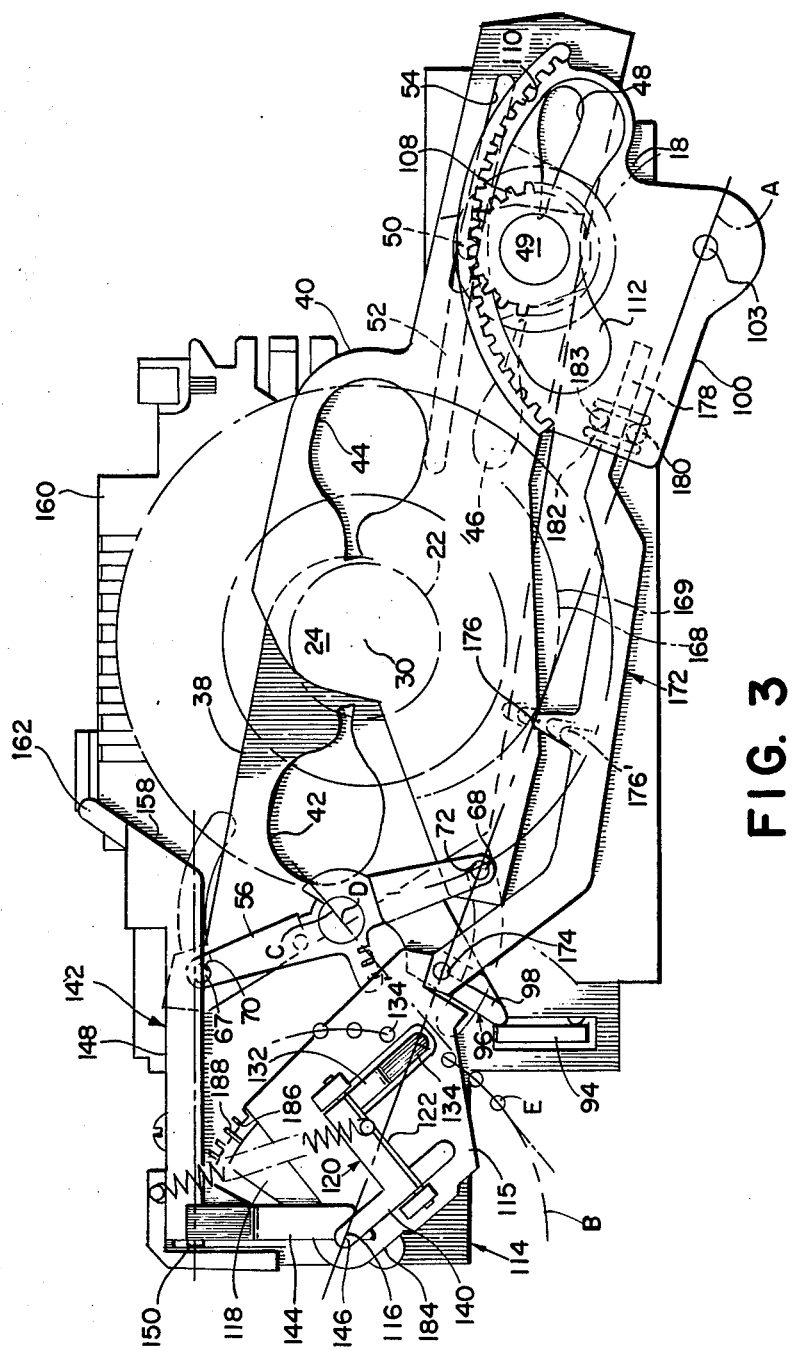
FIG. 3 is a cutaway front view of the exposure control system of FIG. 2.
Figure 4:
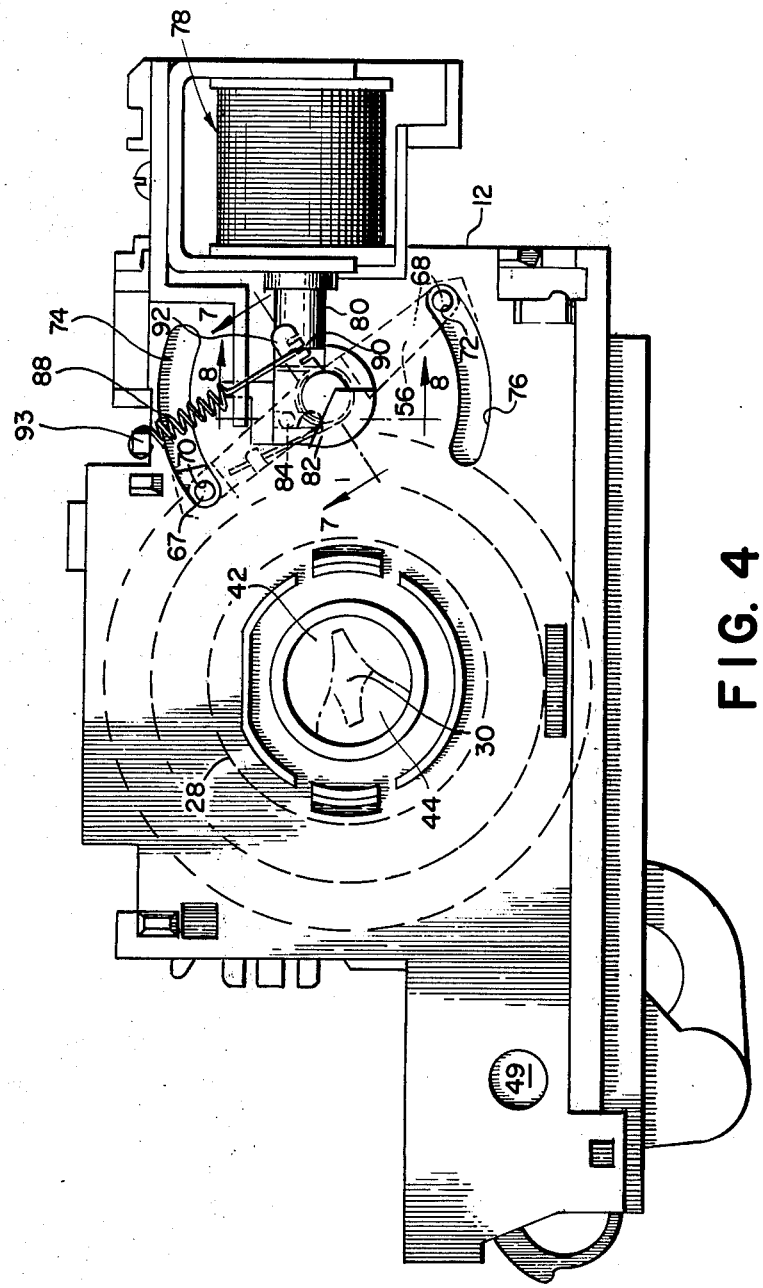
FIG. 4 is a cutaway back view of the exposure control system of FIG. 1.
Figure 7:
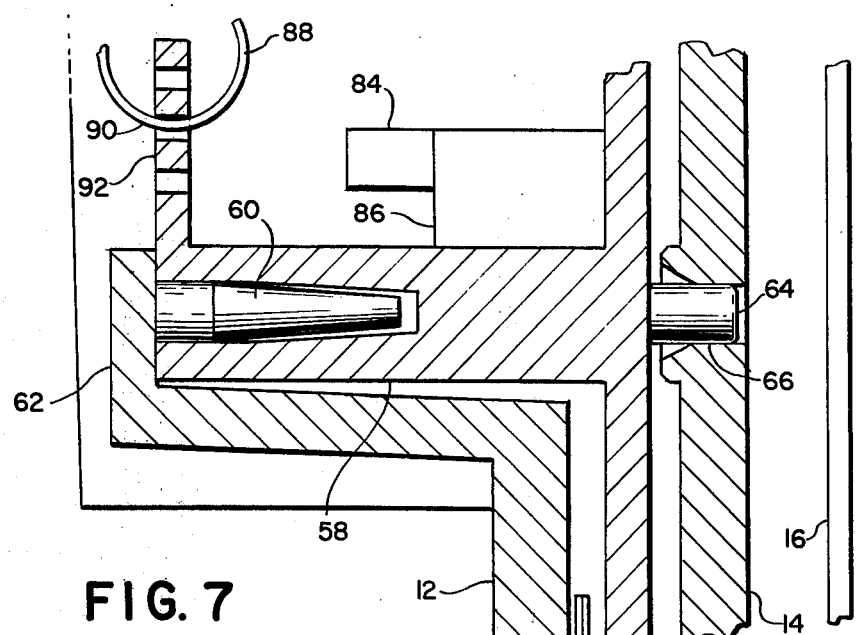
FIG. 7 is a broken away cross-sectional view taken across the lines 7—7 of FIG. 4.
Figure 8:
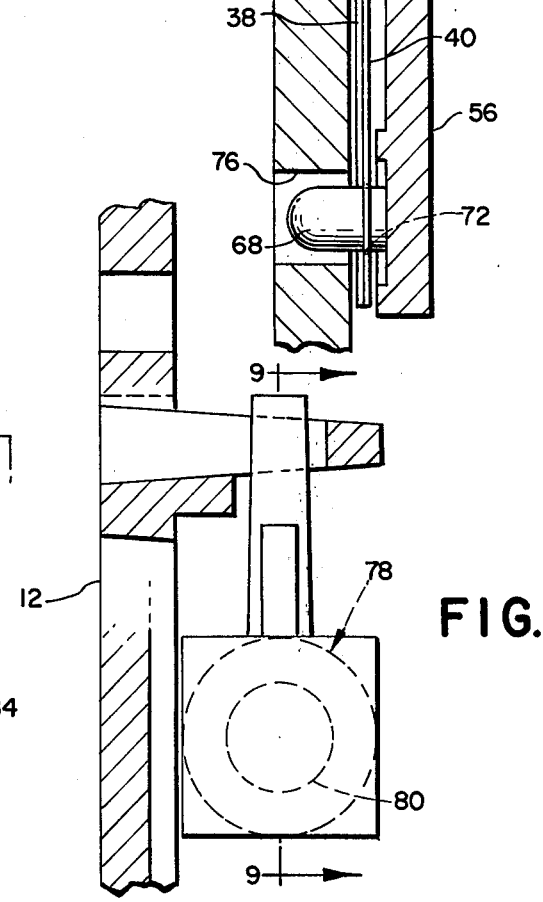
FIG. 8 is a broken away cross-sectional view taken across the lines 8—8 of FIG. 4.
Figure 9:
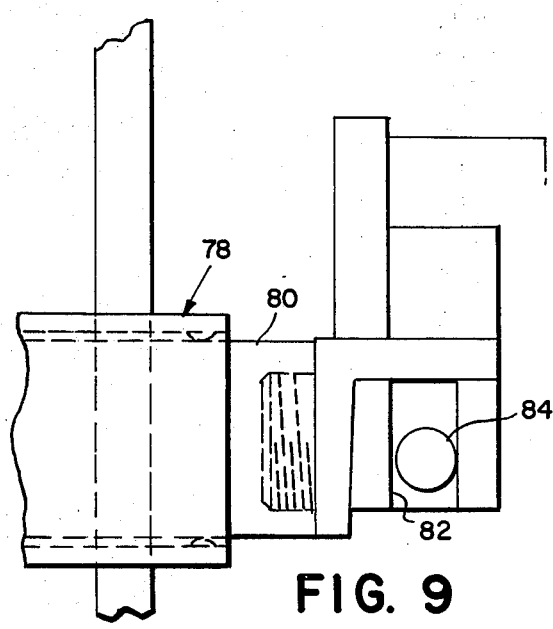
FIG. 9 is a broken away cross-sectional view taken across the lines 9—9 of FIG. 8.

Actuation of the interceptor flapper linkage 120 during the flash mode of operation is provided as follows. Insertion of a conventional linear flash array unit (not shown) into its associated receiving socket 160 operates to engage the tip portion 162 of the actuating assembly 142 so as to rotate the upwardly extending arm portion 158 thereof about the pivot pins 150, 152 and inwardly from the plane of the drawing as illustrated in FIGS. 2 and 3. Rotation of the upwardly extending arm portion 158 in this manner in turn operates to rotate the downwardly extending arm portion 144 outwardly from the plane of the drawing as shown in FIGS. 2 and 3 so as to engage the upwardly extending arm portion 140 of the interceptor flapper linkage 120. The interceptor flapper linkage 120 is thus rotated about the pivot pins 124, 126 against the bias of tension spring 164 such that the interceptor pin 134 and its associated arm portion 132 rotate inwardly from the plane of the drawing as shown in FIGS. 2 and 3 into the locus of travel of the walking beam 56 and its associated integral cam 96 as best shown in FIG. 5. As previously discussed, since the arcuate edge surface 136 of the interceptor pin 134 is generated about the same center axis about which the flapper linkage rotates, the precise point of walking beam interception is therefore determined irrespective of the exact number of degrees through which the interceptor flapper linkage 120 rotates upon insertion of a linear flash array. As it now apparent, it is not necessary that the tip portion 162 of the actuating assembly 142 be always rotated through a precise number of degrees in order to locate the interceptor pin 134 at a precise point of interception. Thus each linear flash array unit need not be exactly dimensioned in order to precisely locate the interceptor pin.

During the flash mode of operation the interceptor crank assembly 114 is actuated in the aforementioned manner to move the interceptor pin 134 into the locus of travel of the walking beam 56 and its associated integral cam 96. Once actuated the interceptor pin 134 is thereafter in position to intercept the cam surface 98 of the walking beam 56 during an exposure interval, which point of interception coincides with a precise aperture value as is determined by the cooperative relation of the aperture blade elements 38 and 40 together with their associated light admitting primary apertures 42 and 44. In this manner the camera may be adjusted in accordance with the levels of artificial illumination anticipated at the scene to be photographed.

Thus the mechanical and geometric relationship between the radial face cam 168, trim link 172, interceptor crank assembly 114, and interceptor cam 134 are based upon an application and evaluation of the inverse square law of light energy propagation where the light energy available from a given source is considered to vary inversely with the square of the distance from that source. An analog representation of the light source to subject distance is provided by the radial face cam 168 which moves in correspondence with the focusing bezel 20 to drive the trim link 172 about the drive pin 180 so as to in turn rotate the interceptor crank assembly 114 about the fixed pivot point 116. As is readily apparent, the interceptor pin 134 is also rotated in concert with the interceptor crank assembly 114 so as to vary its location along the walking beam 56 and integral cam 96 locus of travel in accordance with the inverse square law of light energy propagation. In other words, the maximum aperture to which the aperture blade elements 38, 40 may open is directly determined by the focusing system of the camera in conformance with the inverse square law of light energy propagation.

In the orientation corresponding to an F/8 stop, interceptor pin 134 is positioned to establish a fully open aperture. Other positions of interceptor pin 134 serving to arrest walking beam cam 98 to establish progressively diminishing apertures up to about F/107 are shown at 134' thus defining positions at which the walking beam cam 96 is intercepted for the diminishing aperture sizes. The locus of travel of interceptor pin 134 as illustrated by the series of circles at 134' describes an arcuate segment of a circle the center of which coincides with the center of rotation of the interceptor crank assembly 114 at pivot point 116. Relative positions of follower portion 176 of link 172 for various adjustments of focus bezel 20 are shown at 176'. These serially disposed positions of integral cam follower 176 follow the same F-number sequence in correspondence with the interceptor pin 134 as well as walking beam cam 96. The radial face cam 168 may also be configured to provide a dwell portion during which a continuous maximum aperture is established. This portion of the focusing range represents subject distances from infinity to the effective output range of the source of artificial illumination being used. As ths effective range is reached, the cam 168 is configured to commence simultaneous translation and rotation of adder link 172 about pivot pin 180 in a manner causing interceptor pin 134 to rotate about its respective pivot point at 116 so as to define progressively increasing numerical values of aperture.

The trim bezel 18 may also be manually rotated to provide trim adjustment in the following manner. Manual rotation of the trim bezel 18 is imparted to the optical trim wedge 100 by way of the meshed teeth 108, 110. Rotation of the trim wedge 100, in turn, operates to rotate its associated drive pin 180 about the point of pivotal connection at 103 between the trim wedge 100 and mounting plate 102. The rotation of drive pin 180 in turn operates to rotate the adder link 172 about its follower portion 176 so so to pivot the interceptor crank assembly 114 about its associated point of pivot at 116.

In this manner, the interceptor pin 134 may be rotated through its arcuate path in concert with rotation of the trim bezel 18. Accordingly, manual rotation of trim bezel 18 causes the position of interceptor pin 134 to be selectively advanced or retarded in its aperture defining position therewithin and the interceptor assembly 114 can thus be adjusted or trimmed by any select exposure value through a simple manipulation of the trim bezel 18. The trim bezel 18 may be adjusted through either a clockwise or counterclockwise rotation thereof from an intermediate neutral position as shown in FIG. 3. As is readily apparent from FIG. 3, full counterclockwise rotation of the trim wedge 100 operates to permit the adder link 172 to be rotated by the biasing spring 164 in a clockwise direction about the follower portion 176, thus rotating the interceptor crank assembly 114 and its associated interceptor pin 134 in a counterclockwise direction about the pivot point 116 to define a progressively increasing aperture area. Conversely, clockwise rotation of trim wedge 100 about its associated pivot point 103 operates to rotate adder link 172 about its follower portion 176 and against the bias of spring 164 in turn rotating interceptor crank assembly 114 and its associated interceptor pin 134 in a clockwise direction about pivot point 116 to define progressively decreasing aperture areas.

As is now readily apparent, an important feature of this adjustment is that a full clockwise or counterclockwise rotation of the trim bezel 18 from its neutral position will always operate to impart a substantially corresponding change in the degrees of rotation of the interceptor pin 134 about the pivot point 116 regardless of the position of focus bezel 20 and its associated radial face cam 168. A predetermined number of degrees rotation of the interceptor pin 134 will in turn correspond to a predetermined number of F/stop changes in the aperture value defined by the scene light admitting primary apertures 42 and 44 regardless of the initial position of the interceptor pin 134. Therefore, the trim adjustment remains substantially uniform regardless of focus and cam 168 adjustment. In other words, rotation of the trim bezel 18 about a preselected number of degrees in either direction from the neutral position will be reflected by a predetermined number of degrees rotation of the interceptor pin 134 about the pivot point 116 thus changing the aperture value by a predetermined number of F/stops regardless of the position of the radial face cam 168 and its associated focus bezel 20. In a preferred mode of operation, it is desirable that a full adjustment of the trim bezel 18 from the neutral position correspond to a one and one half F/stop change in the aperture value.

The above described linear correspondence between the trim adjustment and its associated change in aperture value is made possible by the following mechanical and geometric interrelationship of the exposure system components as best seen in FIG. 3. With the radial face cam 168 adjusted to its intermediate position corresponding to an aperture value halfway between the minimum and maximum aperture values and with the trim bezel 18 adjusted to its neutral position, there can be seen a straight line path A in direct intersection with the pivot points 116, 174, 180 and 103 as well as the interceptor pin 134 and the follower portion 176. The location for the interceptor pin 134 corresponding to the minimal apertural value is next determined by tracing the arcuate locus of travel for the interceptor pin 134 as shown by the phantom line B which is thereafter tangentially intersected by a straight line C which also intersects the center axis D of walking beam 56 rotation. At this point of tangential intersection as shown at E, there is determined the location of the interceptor pin 134 corresponding to the minimum aperture F/stop value. The number of degrees of rotation through which the interceptor pin 134 progresses between the position corresponding to the intermediate aperture F/stop value and the position at E corresponding to the minimum aperture F/stop value may thereafter be determined, and a like number of degrees rotation of the interceptor pin 134 in the opposing direction from the intermediate position will determine the position of the interceptor pin corresponding to its maximum aperture F/stop value. The geometrical relationships herein described between the various exposure mechanism components are believed to make possible the substantially uniform relationship whereby the aperture value changes by a predetermined amount in correspondence with a predetermined change in trim adjustment regardless of exposure setting.

In order to consistently achieve the aforementioned geometrical relationships in a mass produced commercial camera, the cumulative effect of dimensional variations in the individual components must somehow be negated. For this purpose, there is provided the adjusting bar 118 which may be selectively rotated about a fixed pivot point 184 connecting to the base block casting 12. In this manner, rotation of adjusting bar 118 operates to rotate pivot point 116 about pivot point 184 so as to achieve the aforementioned precise alignment as required for uniform correspondence between the change in aperture value and the change in trim adjustment. The outside end of the adjusting bar 118 may include a detent 188 for selective engagement with a corrugated type scale 186 which defines a plurality of discrete settings with regard to the baseblock casting 12.

It will now be appreciated that adjustment of trim bezel 18 and its associated trim wedge 100 also serves to selectively position a plurality of varying light transmissive sections 112 over the light sensing photocell of the light detecting station 49. Therefore as a consequence, any exposure value inserted as a trim from trim bezel 18 is simultaneously transmitted to the interceptor crank assembly 114 as well as into the light detecting station 49. This arrangement is advantageous in systems of the so-called hybrid type as discloded in an application for U.S. Patent entitled "Automatic Exposure Control System" by G. D. Whiteside and B. K. Johnson, filed Aug. 5, 1974 and assigned in common herewith, where follow focus and light detecting means are used in cooperation with each other during the flashmode of operation.

Since certain changes may be made in the above described system and apparatus without departing from the scope of the invention herein involved, it is intended that all matter contained in the description thereof or shown in the accompanying drawings shall be interpreted as illustrative and not in a limiting sense.

I claim:

1. An exposure control mechanism for photographic apparatus of the type having a housing and an optical objective mounted on the housing comprising:

focusing means moveable to adjust the optical objective along an optical path;

exposure means having at least one element movable along a locus of travel and defining a range of apertures over the optical path in correspondence with said element movement;

first means disposed for rotation about a first pivot point in spaced relation with respect to said exposure element locus of travel for arresting movement of said exposure element along said locus of travel to define a select maximum aperture value out of said range of apertures on the optical path, said first means also including an interceptor edge;

second means for rotating said first means about said first pivot point in order to position said interceptor edge at a location along said locus of travel defining said select maximum aperture wherein said second means includes a rigid adder link member drivably contacting said first means and disposed for at least rotational movement with respect to a second pivot point spaced apart from said first pivot point; and cam means movable in correspondence with said focusing means movement and drivably contactable with said adder link member for causing said adder link member to rotate said first means about said first pivot point in order to locate said interceptor edge at a select position establishing said select maximum aperture in correspondence with the distance at which the photographic scene is focused from the optical objective.

2. The exposure control mechanism of claim 1 wherein said rigid adder link member is pivotally connected to said first means and disposed for simultaneous rotational and translational movement with respect to said second pivot point, said adder link additionally including a follower portion intermediate the point of adder link connection to the first means and the second pivot point; said follower portion being drivably engaged by said cam means such that rotation of said cam means in correspondence with said focusing means operates to drive said adder link member in a manner whereby the adder link rotates the first means about the first pivot point thereby locating the interceptor edge at said select position during which time the adder link member is simultaneously rotated and translated about the second pivot point by the cam means and interceptor means respectively.

3. The exposure control mechanism of claim 2 wherein the first and second pivot points together with the point of adder link and first means contact as well as the interceptor edge all lie on a substantially straight line path when the cam means is moved to its intermediate position corresponding to a select maximum value halfway between the minimum and maximum aperture values of said range of apertures.

4. The exposure control mechanism of claim 2 wherein said cam means includes a cam surface substantially concentric with said optical path together with a peripheral flange extending radially outward of said cam surface to provide a light and dust seal.

5. The exposure control mechanism of claim 1 wherein said second pivot point is displacably mounted with respect to said optical path and manually actuable for moving said adder link in a manner which operates to rotate said first means about said first pivot point independently of the position of said focusing and cam means in order to selectively trim the position of said interceptor edge by a predetermined distance.

6. The exposure control mechanism of claim 5 wherein said rigid adder link member is pivotally connected to said first means and diposed for simultaneous rotational and translational movement with respect to said second pivot point wherein said adder link additionally includes a follower portion intermediate the point of adder link connection to the first means and the second pivot point with said follower portion being drivably engaged by said cam means such that rotation of said cam means in correspondence with said focusing means operates to drive said adder link member in a manner whereby the adder link rotates the first means about the first pivot point thereby locating the interceptor edge at said select position during which time said adder link member is simultaneously rotated and translated about the second pivot point by the cam means and first means respectively while manual actuation of said second pivot point operates to pivot said adder link member about the point of engagement between said follower portion and cam means in order to rotate said first means about said first pivot point to trim the position of said interceptor edge from said select position.

7. The exposure control mechanism of claim 6 including manually adjustable means rotatable about a third pivot point spaced apart from said first and second pivot points and operatively connecting to said second pivot point for rotation thereof about said third pivot point during trim adjustment wherein the first, second and third pivot points together with the point of adder link and first means connection as well as the interceptor edge all lie in a substantially straight line path when the cam means is moved to its intermediate position corresponding to a select maximum aperture value halfway between the minimum and maximum aperture values of said range of apertures and said manually adjustable means is moved to its neutral position halfway between its extreme and adjustment positions.

8. The exposure control mechanism of claim 6 wherein said cam means includes a cam surface substantially concentric with said optical path together with a peripheral flange extending outward of said cam surface to provide a light and dust seal.

9. The exposure control mechanism of claim 1 including adjusting means through which the precise location of the first pivot point about which the first means rotates may be selectively varied in order to adjust for the cumulative effect of dimensional variations in the individual components of the exposure control mechanism.

10. The exposure control system of claim 9 wherein the adjusting means includes an adjusting bar to which the first means rotatably connects at said first pivot point and wherein said adjusting bar is disposed for rotation with respect to a third pivot point spaced apart from said first pivot point so that said adjusting bar may be manually rotated about said third pivot point to selectively adjust the position of said first pivot point; said adjusting means additionally including lock means whereby the adjusting bar may be locked in position subsequent to said manual adjustment.

11. An exposure control mechanism for photographic apparatus of the type having means defining an optical path including an optical objective mounted on a housing together with means for defining a film plane comprising:

focusing means movable to adjust the optical objective to image a photographic scene at the film plane;

exposure means for defining a range of apertures over the optical path, said exposure means having a walking beam rotatable about a first pivot point and operatively connecting to at least one element for movement in correspondence therewith to define the range of apertures;

first means rotatable about a second pivot point in spaced relation with respect to said first pivot point for arresting movement of said walking beam along its rotational locus of travel to define a select maximum aperture value out of said range of apertures over the optical path, said first means including an interceptor pin defining an interceptor edge;

second means for rotating said first means about said second pivot point in order to position said interceptor pin at a location about said rotational locus of beam travel defining said select maximum exposure aperture wherein said second means includes a rigid adder link member drivably contacting said first means and disposed for at least rotational movement with respect to a third pivot point spaced apart from said first and second pivot points; and cam means movable in correspondence with said focusing means movement and drivably contactable with said adder link member for causing said adder link member to rotate said first means and its associated interceptor pin about said second pivot point in order to locate said interceptor edge at a select position establishing said select maximum aperture in correspondence with the distance at which the photographic scene is focused from the optical objective.

12. The exposure control mechanism of claim 11 wherein said adder link member pivotally connects to said first means and is disposed for simultaneous rotational and translational movement with respect to said third pivot point wherein said adder link additionally includes a follower portion intermediate the point of adder link connection to the first means and the third pivot point, said follower portion being drivably engaged by said cam means such that rotation of said cam means in correspondence with said focusing means operates to drive said adder link member in a manner whereby the adder link rotates the first means about the second pivot point thereby locating the interceptor edge at said select position during which time the adder link member is simultaneously rotated and slid about the third pivot point by the cam means and first means respectively.

13. The exposure control mechanism of claim 12 wherein the second and third pivot points together with the point of adder link and first means connection as well as the interceptor edge all lie in a substantially straight line path when the cam means is moved to its intermediate position corresponding to a select maximum aperture value halfway between the minimum and maximum aperture values of said range of apertures and wherein the location for the interceptor edge corresponding to the minimum aperture area for said range of apertures is determined at the point of tangential intersection between the locus of travel of said interceptor edge about said second pivot point and a straight line extended through said first pivot point about which said walking beam pivots.

14. The exposure control mechanism of claim 12 wherein said cam means includes a cam surface substantially concentric with said optical path together with a peripheral flange extending radially outward of said cam surface to provide a light and dust seal.

15. The exposure control mechanism of claim 11 wherein said walking beam connects to a second cam surface the edge of which is rotatable into interception with the interceptor pin edge such that rotation of the interceptor pin about the second pivot point from its minimum aperture area defining position operates to progressively increase the select maximum aperture size throughout said range of apertures in a uniform manner whereby each predetermined number of aperture stop changes substantially corresponds to a predetermined number of degrees rotation of said interceptor pin about said second pivot point.

16. The exposure control mechanism of claim 11 wherein said third pivot point is displaceably mounted with respect to said optical path and manually actuable for moving said adder link in a manner operating to rotate said first means about said second pivot point independently of the position of said focusing and cam means in order to selectively trim the position of said interceptor edge by a predetermined amount.

17. The exposure control mechanism of claim 16 wherein said rigid adder link member is pivotally connected to said first means and disposed for simultaneous rotational and translational movement with respect to said third pivot point wherein said adder link additionally includes a follower portion intermediate the point of adder link connection to the first means and the third pivot point with said follower portion being drivably engaged by said cam means such that rotation of said cam means in correspondence with said focusing means operates to drivie said adder link member in a manner whereby the adder link rotates the first means about the second pivot point thereby locating the interceptor edge at said select position during which time the adder link member is simultaneously rotated and translated about the third pivot point by the cam means and first means respectively while adjustment of said trim means operates to pivot said adder link member about the point of engagement between said follower portion and cam means in order to rotate said first means about said second pivot point to trim the position of said interceptor edge from said select position.

18. The exposure control mechanism of claim 17 including manually adjustable means rotatable about a fourth pivot point spaced apart from said first, second, and third pivot points and operatively connecting to said second pivot point for rotation thereof about said fourth pivot point during trim adjustment wherein the second, third and fourth pivot points together with the point of adder link and first means connection as well as the interceptor edge all lie in a substantially straight line path when the cam means is moved to its intermediate position corresponding to a select maximum aperture value halfway between the minimum and maximum aperture values of said range of apertures and said manually adjustable means is moved to its neutral position halfway between its extreme end adjustment positions and wherein the location of the interceptor edge corresponding to the minimum aperture value of said range of apertures is determined at the point of tangential intersection between the locus of travel of said interceptor edge about said second pivot point and a straight line extended through said first pivot point about which said walking beam pivots.

19. The exposure control mechanism of claim 17 wherein said cam means includes a cam surface substantially concentric with said optical path together with a peripheral flange extending radially outward of said cam surface to provide a light and dust seal.

20. The exposure control mechanism of claim 16 wherein said walking beam connects to a cam surface, the edge of which is rotatable into interception with the interceptor pin edge such that rotation of the interceptor pin about the second pivot point from its minimum aperture area defining position operates to progressively increase the select maximum aperture size throughout said range of apertures in a uniform manner whereby each predetermined number of aperture stop changes substantially corresponds to a predetermined number of degrees rotation of said interceptor pin about said second pivot point.

21. The exposure control mechanism of claim 11 including adjusting means through which the precise location of the second pivot point about which the first means rotates may be selectively varied in order to adjust for the cumulative effect of dimensional variations in the individual components of the exposure control mechanism.

22. The exposure control mechanism of claim 21 wherein the adjusting means includes an adjusting bar to which the first means is rotatably connected at said second pivot point wherein said adjusting bar is disposed for rotation with respect to a third pivot point spaced apart from said second pivot point so that said adjusting bar may be manually rotated about said third pivot point to selectively adjust the position of said second pivot point; said adjusting means further including lock means whereby the adjusting bar may be locked in position subsequent to said manual adjustment.

23. An exposure control system for photographic apparatus of the type which is operative in an ambient mode responsive to the light level of a scene being photographed and in a flash mode responsive to the level of flashlamp illumination anticipated at said scene together with means defining an optical path including an optical objective adjustable to image the scene at an image plane comprising:
- focusing means movable to adjust the optical objective;
- exposure means movable along a locus of travel to define a range of apertures over the optical path;
- first means selectively actuable during the flash mode for moving into said exposure means locus of travel and rotatable about a first pivot point in spaced relation with respect to said exposure element locus of travel and including an interceptor pin defining an interceptor edge portion for arresting movement of said exposure means along said locus of travel to define a select maximum aperture out of said range of apertures over said optical path;
- second means for rotating said first means about said first pivot point in order to position said interceptor edge at a location along said locus of travel defining said select maximum exposure aperture including a rigid adder link member drivably contacting said first means and disposed for at least rotational movement with respect to a second pivot point spaced apart from said first pivot point;
- cam means movable in correspondence with said focusing means movement and drivably contactable with said adder link member for causing said said link member to rotate said first means about said first pivot point in order to locate said interceptor edge at a select position establishing said select maximum aperture in correspondence with the level of said artificial illumination anticipated at the photographic scene; and
- drive means selectively actuable for moving said exposure means.

24. The exposure control system of claim 23 including:
light sensitive circuit means for varying an electrical parameter in correspondence with the light level at a scene being photographed for selectively actuating said drive means to control said exposure mechanism in accordance with said electrical parameter; and wherein said second pivot point is displaceably mounted with respect to said optical path for movement in correspondence with manually actuable trim means which are provided for simultaneously effecting a predetermined exposure value alteration of the exposure regulating performance of said light sensitive circuit means while at the same time selectively driving said adder link in a manner operating to rotate said first means about said first pivot point independently of said focusing and cam means to vary the position of said interceptor edge portion by a predetermined amount.

25. The exposure control system of claim 24 wherein said rigid adder link member pivotally connects to said first means and is disposed for simultaneous rotational and translational movement with respect to said second pivot point, said adder link additionally including a follower portion intermediate the point of adder link connection to the first means and said second pivot point with said follower portion being drivably engaged by said cam means such that rotation of said cam means in correspondence with said focusing means operates to drive said adder link member in a manner whereby the adder link rotates the first means about the first pivot point thereby locating the interceptor edge at said select position during which time the adder link member is simultaneously rotated and translated about the second pivot point by the cam means and first means respectively while adjustment of said trim means operates to pivot said adder link member about the point of engagement between said follower portion and cam means in order to rotate said first means about said first pivot point to vary the position of said interceptor edge from said select position.

26. The exposure control mechanism of claim 25 wherein said trim means includes manually adjustable means having a plurality of areas of varying light transmissive properties rotatable about a third pivot point spaced apart from said first and second pivot points and operatively connected to said second pivot point for rotation thereof about said third pivot point during trim adjustment wherein the first, second, and third pivot points together with the point of adder link and first means connection as well as the interceptor edge all lie in a substantially straight line path when the cam means is moved to its intermediate position corresponding to a select maximum aperture value halfway between the minimum and maximum aperture values of said range of apertures and said trim means is moved to its neutral position halfway between its minimum and maximum adjustment positions.

27. The exposure control system of claim 23 including adjusting means through which the precise location of said first pivot point about which the first means rotates may be selectively varied in order to adjust for the cumulative effect of dimensional variations in the individual components of the exposure control mechanism.

28. The exposure control system of claim 27 wherein the adjusting means includes an adjusting bar to which the first means is rotatably connected at said first pivot point wherein said adjusting bar is disposed for rotation with respect to a second pivot point spaced apart from said first pivot point so that said adjusting bar may be manually rotated about said second pivot point to selectively adjust the position of said first pivot point; said adjusting means additionally including lock means whereby the adjusting bar may be locked in position subsequent to said manual adjustment.

29. An exposure control mechanism for photographic apparatus of the type having means for defining an optical path including an optical objective adjustable to image a photographic scene at an image plane comprising:
focusing means movable to adjust the optical objective;
exposure means having at least one element movable along a locus of travel and defining a range of apertures over said optical path in correspondence with said element movement;
first means disposed for selective movement with respect to said exposure element locus of travel and including an edge portion for arresting movement of said exposure element along said locus of travel to define a select maximum aperture value over said optical path;
second means drivable to move said first means in order to position said interceptor edge portion at a location along said locus of travel defining said select maximum aperture; and
cam means movable in correspondence with said focusing means movement and including a cam surface substantially concentric with said optical path; said cam surface being drivably contactable with said second means for moving said first means to locate said interceptor edge portion at a select position establishing said select maximum aperture in correspondence with the distance at which the photographic scene is positioned from said optical objective.

30. The exposure control mechanism of claim 29 wherein said second means includes an adder link in driving contact with said first means at a location on one side of said optical path, said adder link being disposed for at least rotational movement with respect to a select pivot point on the other side of said optical path and said adder link additionally including a cam follower portion contacting said cam surface at a location intermediate the first means and the first pivot point.

31. The exposure control mechanism of claim 30 wherein said select pivot point is displaceably mounted with respect to said optical path and manually actuable for moving said adder link in a manner driving said first means to selectively trim the position of said edge portion by a predetermined amount from said select position.

32. The exposure control mechanism of claim 29 wherein said first means is disposed for rotation about a first pivot point spaced laterally apart from said cam means on one side of said optical path and said second means includes a rigid adder link member pivotally connected to said first means and disposed for simultaneous rotational and translational movement with respect to a second pivot point spaced laterally apart from said first point on the other side of said optical path, wherein said adder link additionally includes a follower portion intermediate the point of adder link connection to the first means and the second pivot point; said follower portion being drivably engaged by said cam means such that rotation of said cam means in correspondence with said focusing means operates to drive said adder link member in a manner whereby the adder link rotates the first means about the first pivot point thereby locating the interceptor edge at said select position during which time the adder link member is simultaneously rotated and translated about the second pivot point by the cam means and first means respectively.

33. The exposure control system of claim 32 wherein said second pivot point is displaceably mounted with respect to said optical path and manually actuable for causing said adder link to simultaneously rotate and translate with respect thereto, thus rotating said first means about said first pivot point independently of said focusing and cam means in order to selectively vary the position of said edge portion by a predetermined amount from said select position.

* * * * *